(12) United States Patent
Medford

(10) Patent No.: US 8,505,253 B1
(45) Date of Patent: Aug. 13, 2013

(54) SHELTER THAT IS CAPABLE OF WITHSTANDING STRONG WINDS

(71) Applicant: Holland Medford, Lihue, HI (US)

(72) Inventor: Holland Medford, Lihue, HI (US)

( * ) Notice: Subject to any disclaimer, the term of this patent is extended or adjusted under 35 U.S.C. 154(b) by 0 days.

(21) Appl. No.: 13/656,677

(22) Filed: Oct. 20, 2012

(51) Int. Cl.
*E04B 1/70* (2006.01)
*E04F 17/00* (2006.01)

(52) U.S. Cl.
USPC .......... 52/302.1; 52/293.3; 52/204.2; 52/473; 454/284; 454/333

(58) Field of Classification Search
USPC ................ 52/92.1, 93.2, 293.3, 302.1, 204.2, 52/473; 454/265, 271–336
See application file for complete search history.

(56) References Cited

U.S. PATENT DOCUMENTS

| | | | |
|---|---|---|---|
| 108,110 A | 10/1870 | Cone | |
| 4,615,158 A | 10/1986 | Thornton | |
| 4,632,041 A | 12/1986 | Ohlson | |
| 4,642,952 A | 2/1987 | Prandin | |
| 4,787,181 A | 11/1988 | Witten et al. | |
| 5,662,132 A | 9/1997 | Larsen | |
| 5,689,922 A * | 11/1997 | Daudet | 52/210 |
| 5,893,241 A | 4/1999 | Schroeder | |
| 5,921,043 A | 7/1999 | McDonald | |
| 5,930,961 A | 8/1999 | Beaudet | |
| 5,937,591 A * | 8/1999 | Markey | 52/94 |
| 5,953,866 A | 9/1999 | Poole | |
| 5,956,907 A | 9/1999 | Martin | |
| 5,976,009 A * | 11/1999 | Achen | 454/195 |
| 5,979,123 A * | 11/1999 | Brockman | 52/101 |
| 5,983,578 A | 11/1999 | Huttie et al. | |
| 6,003,271 A | 12/1999 | Boyer et al. | |
| 6,085,475 A | 7/2000 | Parks et al. | |
| 6,092,340 A * | 7/2000 | Simmons | 52/92.1 |
| 6,151,841 A | 11/2000 | Green | |
| 6,161,345 A | 12/2000 | Hope et al. | |
| 6,226,932 B1 | 5/2001 | Friedrich | |
| 6,256,960 B1 * | 7/2001 | Babcock et al. | 52/592.1 |
| 6,308,466 B1 | 10/2001 | Moriarty | |
| 6,334,278 B1 | 1/2002 | Arnold | |
| 6,349,508 B1 | 2/2002 | Ju et al. | |
| 6,385,919 B1 | 5/2002 | McCarthy | |
| 6,385,920 B1 | 5/2002 | Chandler | |
| 6,389,762 B2 * | 5/2002 | Le Poire | 52/204.2 |
| 6,393,776 B1 | 5/2002 | Waller | |
| 6,401,409 B1 | 6/2002 | Martin | |
| 6,412,231 B1 | 7/2002 | Palatin | |
| 6,415,557 B1 | 7/2002 | McCalley | |
| 6,415,558 B1 | 7/2002 | Cherry | |
| 6,430,881 B1 * | 8/2002 | Daudet et al. | 52/92.2 |
| 6,434,896 B1 | 8/2002 | Mitchell | |

(Continued)

*Primary Examiner* — Brian Glessner
*Assistant Examiner* — Brian D Mattei
(74) *Attorney, Agent, or Firm* — Plager Schack LLP

(57) ABSTRACT

A shelter is capable of withstanding extreme winds. The shelter comprises a concrete foundation mechanically coupled to a lower continuous track by an anchor bolt. The lower continuous track is mechanically coupled to load bearing studs and second load bearing studs. The load bearing studs and second load bearing studs are mechanically coupled to an upper continuous track. The arrangement of studs secured between two tracks provides additional stability against variable wind loads that normally damage buildings. The load bearing studs are arranged with second load bearing studs to create walls, where the walls are covered by a first exterior layer and a second exterior layer. The first exterior layer plates provide protection against live force loads and the second external layer provides protection against vibration. The upper continuous track is mechanically coupled to roofing.

3 Claims, 6 Drawing Sheets

(56) References Cited

U.S. PATENT DOCUMENTS

| | | |
|---|---|---|
| 6,438,906 B1 | 8/2002 | Komarowski et al. |
| 6,490,830 B2 | 12/2002 | Ruan |
| 6,546,679 B1 * | 4/2003 | Bushberger ................ 52/169.14 |
| 6,938,381 B1 | 9/2005 | Villa |
| 6,948,281 B1 | 9/2005 | Carmichael |
| 7,237,362 B2 | 7/2007 | Bishop |
| 7,442,949 B2 | 10/2008 | Foster |
| 7,458,305 B1 | 12/2008 | Horlander et al. |
| 7,527,663 B2 | 5/2009 | Riedo |
| 7,690,159 B1 | 4/2010 | Arnold |
| 7,716,899 B2 * | 5/2010 | Beck et al. ................ 52/741.13 |
| 8,091,316 B2 * | 1/2012 | Beck et al. ................ 52/650.1 |
| 2001/0037615 A1 | 11/2001 | Riech |
| 2001/0039770 A1 | 11/2001 | Arnold |
| 2002/0184837 A1 | 12/2002 | Shelton |
| 2003/0024174 A1 * | 2/2003 | Bonds et al. ................ 52/79.1 |
| 2003/0167708 A1 | 9/2003 | Shaw |
| 2003/0172596 A1 | 9/2003 | Talley |
| 2004/0123783 A1 | 7/2004 | Dang et al. |
| 2004/0163337 A1 | 8/2004 | Claerbout |
| 2004/0168620 A1 | 9/2004 | Vitale et al. |
| 2005/0262795 A1 | 12/2005 | Hudson |
| 2006/0096192 A1 * | 5/2006 | Daudet ................ 52/204.1 |
| 2006/0143995 A1 | 7/2006 | Beal |
| 2006/0254167 A1 * | 11/2006 | Antonic ................ 52/293.3 |
| 2008/0155912 A1 * | 7/2008 | Frobosilo ................ 52/204.2 |
| 2009/0064604 A1 | 3/2009 | Yamaguchi |
| 2010/0236158 A1 * | 9/2010 | Carbonaro ................ 52/92.1 |
| 2011/0225912 A1 * | 9/2011 | Achen ................ 52/302.1 |
| 2012/0233946 A1 * | 9/2012 | Espinosa ................ 52/293.3 |

\* cited by examiner

SHELTER THAT IS CAPABLE OF WITHSTANDING STRONG WINDS

FIELD OF THE INVENTION

This invention relates to structures used to house individuals during inclimate weather.

BACKGROUND OF THE INVENTION

Extreme weather has existed throughout recorded history. Storms that created 250 miles per hour (mph) wind loads such as hurricanes, tornadoes, and high velocity straight winds have historically caused massive damage to structures and escaped a meaningful solution.

Turning to the prior art, U.S. Pat. No. 4,787,181 issued to Witten describes a shelter and construction method where two complementarily positioned shells would shield the inside of the shell from electromagnetic waves. Among other differences Witten uses corner caps instead of concrete feet. The lack of a secure footing would make Witten susceptible to damage in a storm.

Similar to Witten, U.S. Pat. No. 5,662,132 issued to Larsen contains a structure designed to be used indoors in the event of an earthquake. Larsen has an open construction which would evade implosion in a hurricane or tornado, however this pole construction would not handle a 125 psf live load, from a side. Larson would be able to protect a user's head, but that is about it.

U.S. Pat. No. 6,415,557 issued to McCalley teaches a protective structure. McCalley takes a slightly different approach that the present invention. The present invention utilizes tracks held into a footing with anchor bolts. McCalley teaches a large number of bolts linking a series of C-shaped studs. McCalley attempts to answer the same challenge as the disclosed invention, but does so ineffectively because the lack of vents and unknown doors do not protect the external structure from implosion or debris damage.

BRIEF SUMMARY OF THE INVENTION

A shelter is capable of withstanding extreme winds. The shelter comprises a concrete foundation mechanically coupled to a lower continuous track by an anchor bolt. The lower continuous track is mechanically coupled to load bearing studs and second load bearing studs. The load bearing studs and second load bearing studs are mechanically coupled to an upper continuous track. The arrangement of studs secured between two tracks provides additional stability against variable wind loads that normally damage buildings. The load bearing studs are arranged with second load bearing studs to create walls, where the walls are covered by a first exterior layer and a second exterior layer. The steel plates provide protection against live force loads and the plywood provides protection against vibration. The upper continuous track is mechanically coupled to roofing.

In some embodiments, walls have an interior surface and an exterior surface. The interior surface is perforated with an adjustable louvered vent. The exterior surface is perforated with a fixed louvered vent. This enables the shelter to rapidly adjust to changing pressure and avoid implosion.

Lintel tracks are mechanically coupled to the upper continuous track with a clip and straps. Each lintel track is mechanically coupled to a lintel stud which is further mechanically coupled to an unpunched stud lintel. The lintel stud is mechanically coupled to a door rated to withstand a category five hurricane.

The roofing further comprises the upper continuous track is mechanically coupled to a joist and a truss and the truss is covered by the first exterior layer and the second exterior layer such where the truss protect the shelter from vibrations and negative pressure caused by high winds.

BRIEF DESCRIPTION OF THE SEVERAL VIEWS OF THE DRAWINGS

Figure 1:
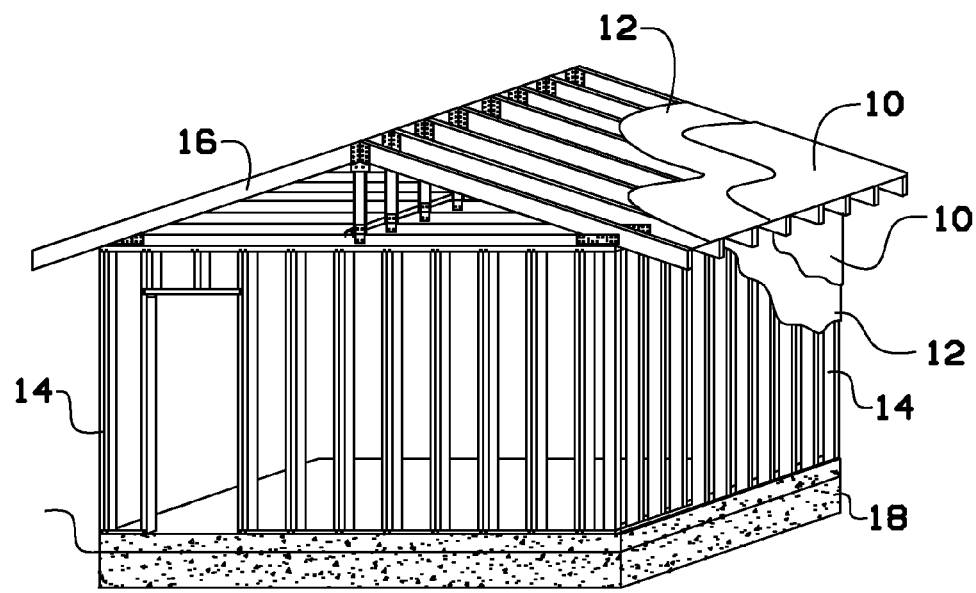
Figure 2:
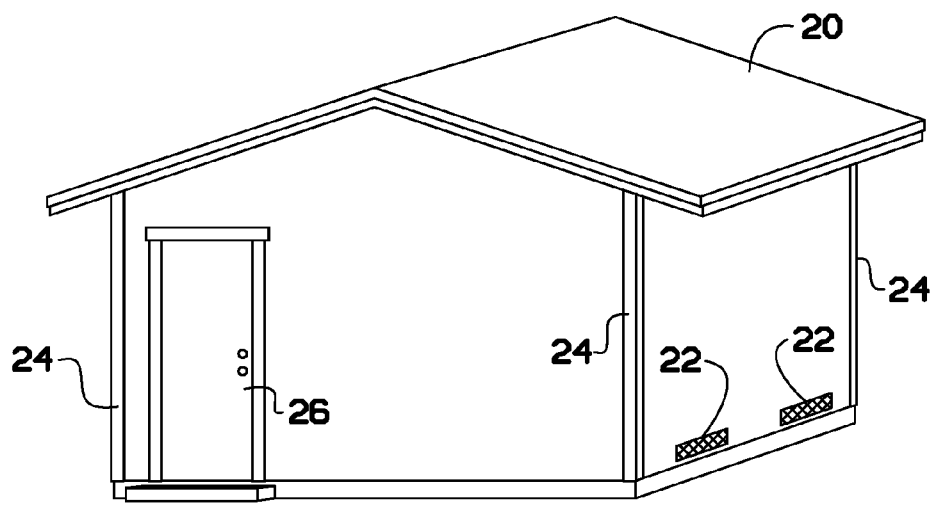
Figure 3:
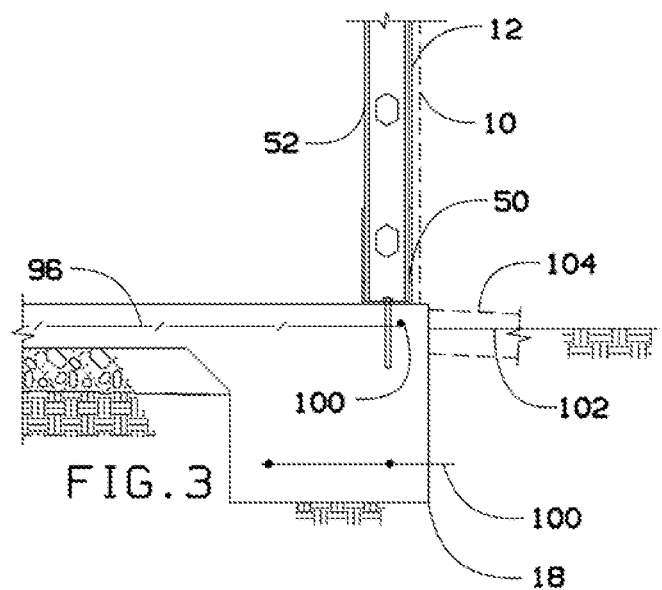
Figure 4:
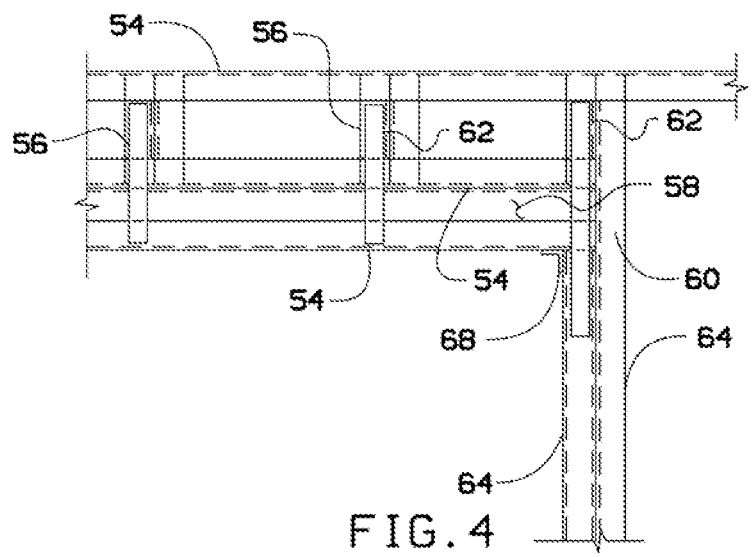
Figure 5:
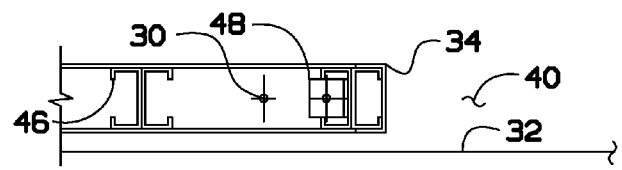
Figure 6:
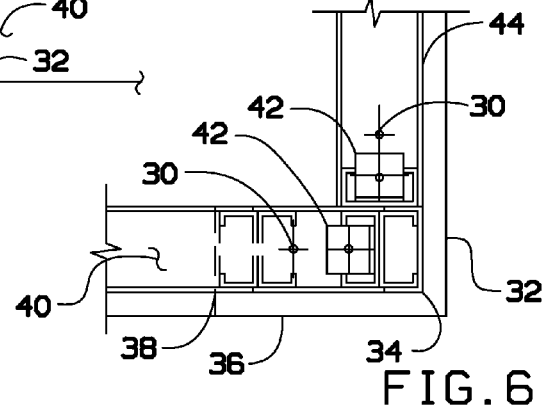
Figure 7:
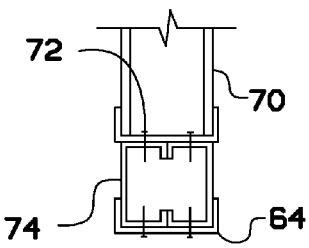
Figure 8:
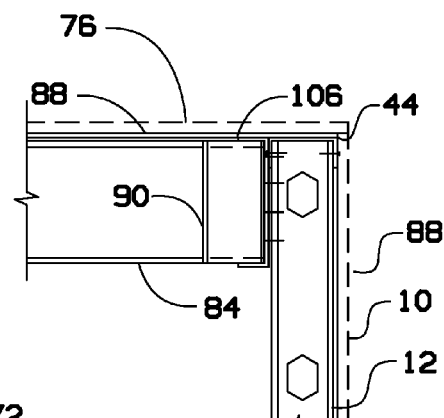
Figure 9:
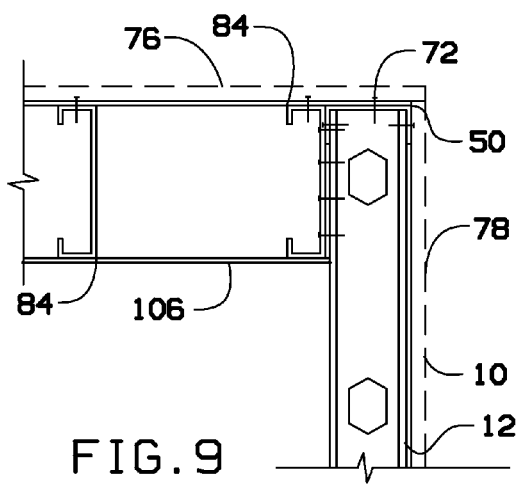
Figure 10:
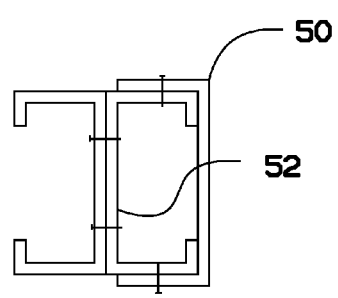
Figure 11:
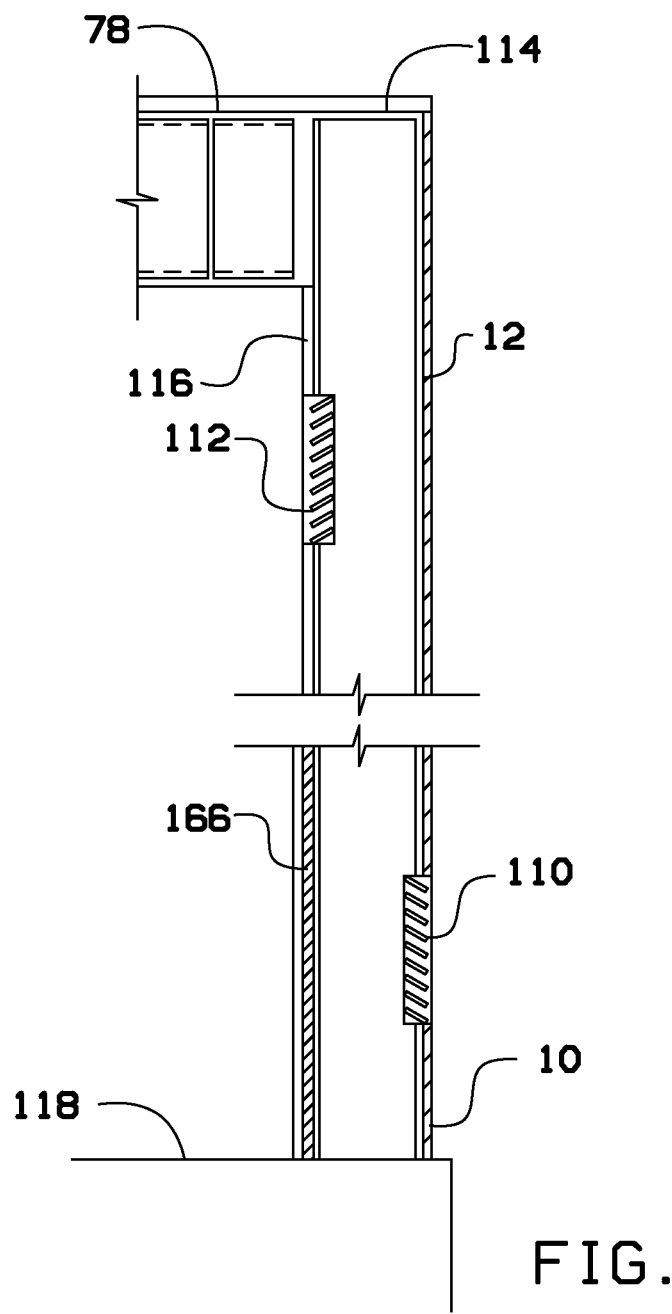
Figure 12:
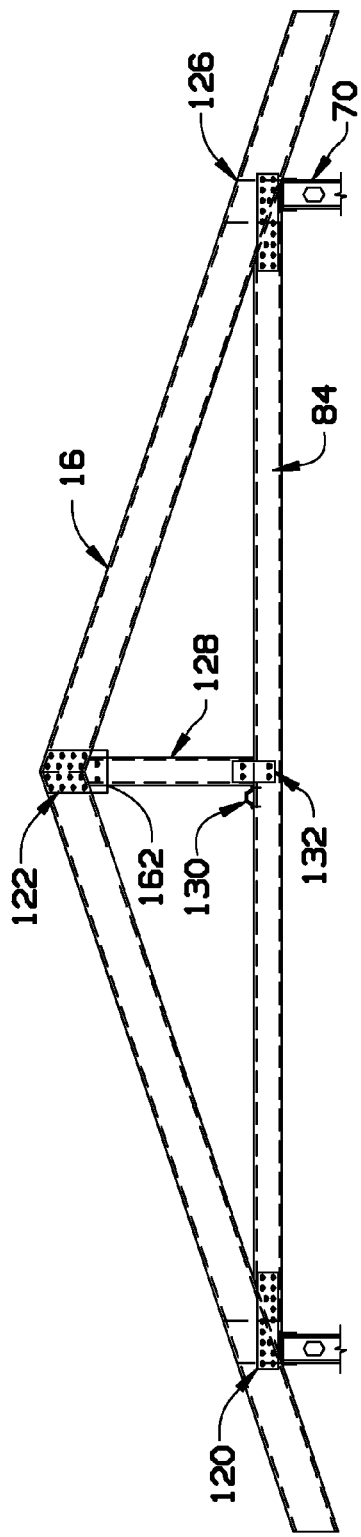
Figure 13:
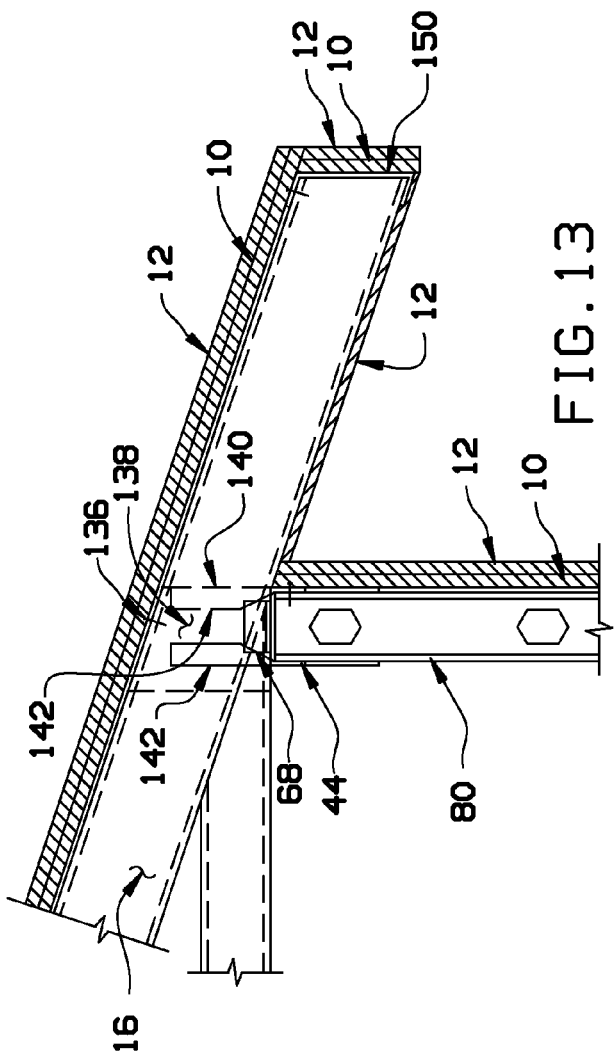
Figure 14:
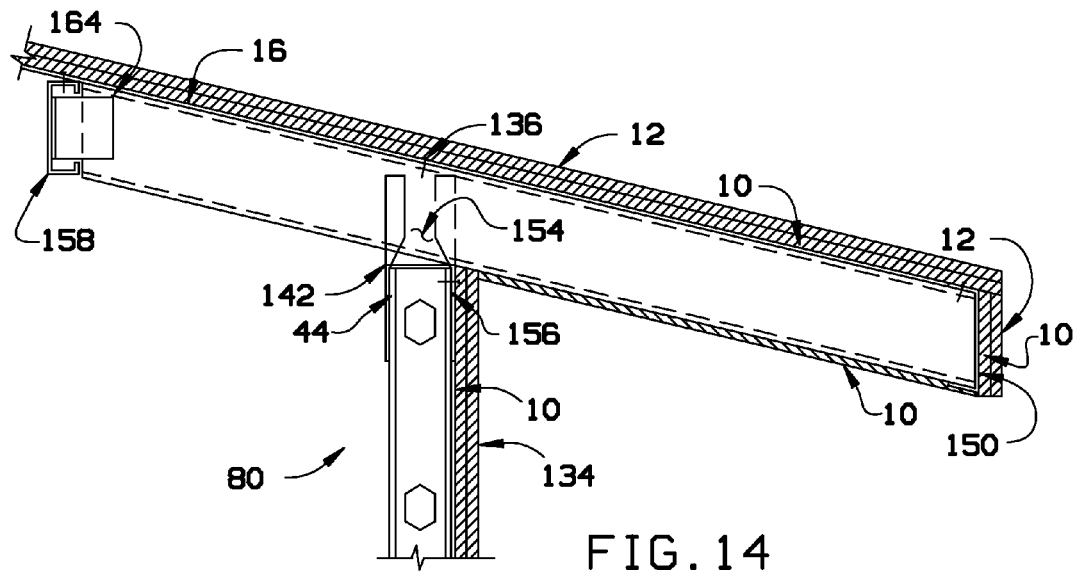
Figure 15:
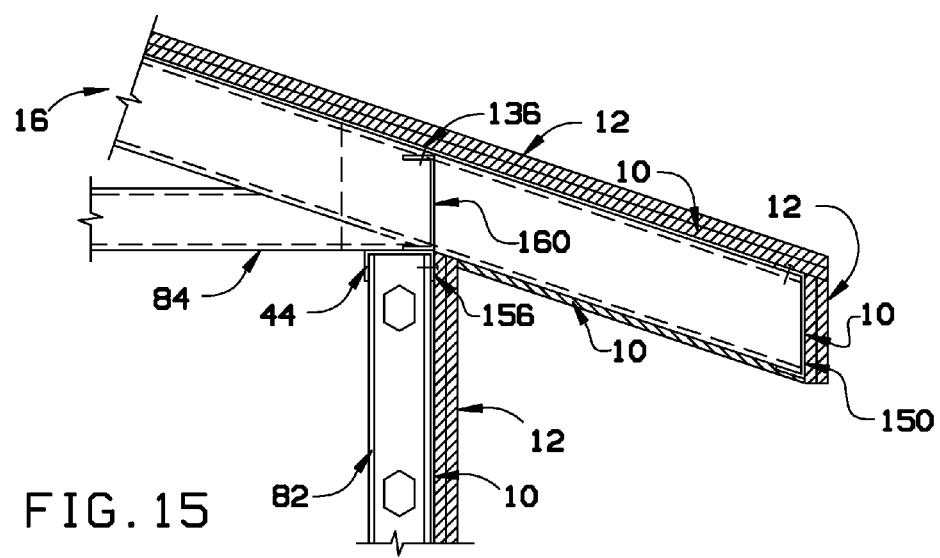

Having thus described the invention in general terms, reference will now be made to the accompanying drawings, which are not necessarily drawn to scale, and wherein:

FIG. 1 is a perspective cut-away view of the invention.
FIG. 2 is a perspective view of the invention.
FIG. 3 is a schematic detail of the exterior steel stud wall footing.
FIG. 4 is a schematic detail of the typical exterior wall lintel—in particular the typical lintel bearing.
FIG. 5 is a plain view of the typical interior door jamb connection to the foundation.
FIG. 6 is a plain view of the typical corner stud connection to foundations.
FIG. 7 is a schematic detail of the typical exterior wall lintel—in particular the lintel section.
FIG. 8 is a schematic detail of a roof joist connection to a bearing stud wall.
FIG. 9 is a schematic detail of a roof joist connection to a second bearing stud wall.
FIG. 10 is a schematic detail of a typical built-up jamb studs with track.
FIG. 11 is a section view of the vents in the stud wall.
FIG. 12 is an elevation view of a typical built-up truss.
FIG. 13 is a section view of a truss bearing at a stud wall.
FIG. 14 is a section view of a corner beam bearing at a stud wall.
FIG. 15 is a section view of a truss blocking at a stud wall.

DETAILED DESCRIPTION OF THE INVENTION

Embodiments of the present invention overcome many of the obstacles associated with creating a structure of sufficient strength to weather a severe storm, and now will be described more fully hereinafter with reference to the accompanying drawings that show some, but not all embodiments of the claimed inventions. Indeed, the invention may be embodied in many different forms and should not be construed as limited to the embodiments set forth herein. Rather, these embodiments are provided so that this disclosure will satisfy applicable legal requirements. Like numbers refer to like elements throughout.

FIG. 1 shows a perspective view of the invention. Concrete footing 18 can support stitched stud 14 as shown in more detail in FIG. 3. Stitched stud 14 is a vertical member that travels upward from a bottom where concrete footing is located to a top where stitched stud 14 can be mechanically coupled to truss stud 16 for load bearing studs discussed below. A plurality of stitched studs can be covered with first exterior layer 12 and then second exterior layer 10 form an exterior wall. Likewise, a plurality of truss studs 16 can be covered with first exterior layer 12 and then second exterior layer 10 to form a first roof surface.

To build the shelter that is capable of withstanding strong winds, a user should first set up the frame, where the frame comprises the studs in the concrete footing and the truss as described below. Next, the frame is covered with first exterior layer 12, second exterior layer 10 and a finished exterior layer such as a finished wall or roofing materials.

FIG. 2 shows a completed shelter that is capable of withstanding strong winds. The exemplary structure is FIG. 2 has four walls in a parallelepiped arrangement with each side of the parallelepiped having a corner. In some embodiments, each corner can have trim 24. The first roof surface is covered with asphalt shingles 20. At least one side of shelter that is capable of withstanding strong winds further comprises fixed louvered vents 22 as shown in FIG. 11. A user can access the shelter that is capable of withstanding strong winds though door 26.

Where a stitched stud 14 contacts concrete footing 18 there is an exterior steel stud wall footing which is shown in more detail in FIG. 3 the wall footing for an exterior steel stud in a corner is shown in FIG. 6. Turning from the bottom of stitched stud 14 to the top of stitched stud 14, where stitched stud 14 connects to a roof joist there are two different connections depending on whether stitched stud 14 is load bearing. A roof joist connection to a bearing stud wall is shown in FIG. 8. A roof joist connection to a second bearing stud wall is shown in FIG. 9. Over door 26 there is a lintel. The typical lintel bearing is shown in FIG. 4. The lintel section is shown in FIG. 7. On the side of the lintel there are built-up jamb studs with a track as shown in 5.

In the preferred embodiment, the fixed louvered vent is a 8 inch by 12 inch fixed louvered vent. Door 26 is a FEMA 320 Storm Door, if other doors are tested to be adequate to withstand a category five hurricane, those doors may also work.

FIG. 3 shows a detail section view of the exterior steel stud wall footing. Concrete footing 18 comprises rebar 100. Concrete footing 18 further comprises welded wire fabric 96. Concrete footing 18 is mechanically coupled to lower track 50 by a plurality of anchor bolts. A plurality of studs 52 slide into lower track 50 and are mechanically coupled to lower track 50 as shown in FIG. 10. Studs 50 are covered with first exterior layer 12 and then second exterior layer 10. Concrete footing 18 is attached to exterior concrete slab 102, which comprises finished grade 102.

In the preferred embodiment, rebar 100 is 3 #4 continuous steel rebar. Lower track 50 is a 4 inch by 2 inch by 14 gauge steel track of a length determined by the user. Stud 52 is a 4 inch by 2 inch by 14 gauge steel track with #10 screws at 8 inch on center staggered. First exterior layer 12 is 12 gauge steel sheeting 78. Second exterior layer 10 is ¾" or ⅝" plywood. The exterior wall can be made of any known material.

FIG. 4 shows a typical lintel bearing. Here, stitched stud 14 is lintel stud 60 that runs from the lower track 50 (not shown) to continuous top track 54 in lintel track 64. A user can slide lintel stud 60 into lintel track 64 as shown in more detail in FIG. 7. Lintel track 64 is mechanically coupled to continuous top track 54 by clip 68 and straps 62. Straps 62 hold continuous top track 54 into continuous top track 54. Continuous top track 54 is mechanically coupled to double steel studs 56 with straps 62. The top of the doorway is held in place by unpunched stud lintel 58. Which rests on continuous upper track 54 between lintel stud 60 on both sides of the lintel.

In the preferred embodiment, straps 62 are Simpson cs16 straps, clips 68 is a Simpson A33 clip with 3 #10 screws on each leg. Unpunched stud lintel 58 is made of steel.

FIG. 5 shows the relationship of a door jamb to the foundation proximate door 40. The edge of concrete slap 32 is mechanically coupled to housing 34. Housing 34 holds horizontal studs 46 as necessary. Housing 34 is held into place by anchor bolt 30 and stud 46 is held in place by hold down 48.

In the preferred embodiment, housing 34 comprises 4 inch by 2 inch 14 gauge Studs and a four inch by two inch by 14 gauge track at the corner. Anchor bolt 30 is a ½ inch Simpson Titan heavy duty anchor bolt. Hold down 48 is a Simpson s/htt14 hold down with a ⅝ inch hex head anchor bolt.

FIG. 6 shows a typical corner stud connection to a foundation. Edge of concrete 32 is mechanically coupled to floor stud track 44. Housing 34 holds horizontal studs 46 as necessary as shown in FIG. 5. Housing 34 is held into place by anchor bolt 30 and stud 46 is held in place by hold down 42. The exterior of stud track 44 along the wall is covered with plywood 36. The build-up door jamb begins at point 38 and continues to door 40 as noted in FIG. 5.

In the preferred embodiment, hold down 42 is a Simpson s/htt14 hold down with a ⅝ inch hex head anchor bolt.

FIG. 7 shows an overhead detail of lintel track 64 mentioned above. Lintel track 64 is mechanically coupled to lintel 74 by two screws 72. Similarly, lintel 74 is mechanically coupled to the wall of lintel stud 60 (shown here as stud wall 70) by two screws 72.

In the preferred embodiment, lintel 74 is a 4 inch by two inch 14 gauge lintel. Screw 72 is a #10 steel screw.

FIG. 8 shows a schematic detail of a roof joist connection to a bearing stud wall. Truss stud 16 is shown here as load bearing stud 82. Load bearing stud 82 is covered by first exterior layer 12 and second exterior layer 10 as noted above. Load bearing stud 82 is mechanically coupled to continuous upper track 44. Continuous upper track 44 is covered by plywood 88 and roofing 76. Continuous upper track 44 is mechanically coupled to joist track 106. Joist 84 is mechanically coupled to joist track 106 and is mechanically coupled to load bearing stud 82 by stiffener 90. Roofing 76 is shown in more detail in FIG. 12, FIG. 13, FIG. 14, and FIG. 15 below. As used here, roofing means simply where the roof begins as a point of reference.

In the preferred embodiment, load bearing stud 82 is a 4 inch by 2 inch 14 gauge stud every 16 inches on center. Joist 84 is a 6 inch by 2 inch by 14 gauge joist. Joist track 106 is a continuous 6 inch by two inch by 14 gauge track with 3 number 10 screws on each double stud.

FIG. 9 shows a roof joist connection to a second bearing stud wall. Truss stud 16 is shown here as second load bearing stud 82. Second load bearing stud 82 is mechanically coupled to continuous upper track 50. As used here, second load bearing stud 82 refers to a stud that is designed to be subjected to large uplift wind loads and horizontal wind loads. Continuous upper track 50 is mechanically coupled to joist track 106. Joist 84 is mechanically coupled to joist track 106 and is mechanically coupled to second load bearing stud 82 by a series of screws. Joist 84 is covered by roofing 76 as noted above.

FIG. 10 shows built up jam with studs and track. Continuous lower track 50 is mechanically coupled to studs 52 by a series of screws. In the preferred embodiment, continuous track 50 is a 4 inch by 2 inch by 14 gauge track. Stud 52 is a 4 inch×2 inch×14 gauge with #10 screws at 8 inches on center staggered.

FIG. 11 shows a section view of the vents in the stud wall. Flooring 118 is mechanically coupled to truss stud 16 as indicated above. Between truss studs 16 there is a space covered by first exterior layer 12 and second exterior layer 10 on an exterior surface and interior wall 116 on an interior surface. Interior wall 116 is mechanically coupled to support plate 166. Support plate 166 prevents penetration of windblown debris into the interior through fixed louvered vent 110. An exterior surface is perforated by fixed louvered vent 110 closer to the flooring 118 and an interior surface is perforated by adjustable louvered vent 112 closer to the ceiling. One of the unique features of the present invention is the ability to resist implosion, the ability of the structure to rapidly adjust to external pressure substantially increases survivability in hurricanes, tornadoes and other low pressure storms.

In the preferred embodiment, support plate 166 is a 20 inch by 24 inch by 12 gauge steel plate affixed to interior wall 116 directly across from fixed louvered vent 110. The bottom fixed louvered vent is preferably 8 inches by 12 inches.

FIG. 12 shows an elevation view of a typical built-up truss. Stud wall 70 is made of load bearing studs 82 as noted in FIG. 8 above. Stud wall 70 is mechanically coupled to truss stud 16 and joist 84 by gusset 120 which can be strengthened by stiffener 126. Joist 84 is mechanically coupled to wind brace 128 by gusset 132. Hanging beam 130 supports wind brace 132. Wind brace 132 is mechanically coupled to truss stud 16 atridge 164 with gusset 122.

In the preferred embodiment, truss stud 16 is a 2 inch by 6 inch by 14 gauge top chord. Wind brace 128 is a 2 inch by 4 inch by 14 gauge steel beam. Stiffener 126 is a 14 gauge track chord. Gusset 120 is a 14 gauge gusset affixed to stud wall 70 with eight #10 screws and affixed to joist 84 with 8 #10 screws. Gusset 132 has two #10 screws in joist 84 and two #10 screws in wind brace 128. Gusset 122 is a 122 has eight #10 screws in each truss studs 16 and two #10 screws in wind break 128. Ridge 164 shown in more detail in FIG. 14 below.

FIG. 13 shows a section view of a truss bearing at stud wall 70. Here two load bearing studs 82 are immediately adjacent to each other. Load bearing studs 82 are mechanically coupled to continuous upper track 44 by clips 68. Truss 16 is mechanically coupled to upper track 68 by twist straps 142. The space between twist straps 142 creates bay 138. Truss stud 16 is mechanically coupled to first exterior layer 12 and second exterior layer 10 by fastener 136. Note that truss stud 16 comprises curved portion 150 which is also covered by first exterior layer 12 and second exterior layer 10 on a first side and first exterior layer 12 on a second side.

In the preferred embodiment, twist straps 142 are Simpson LTS 13 gauge twist straps.

FIG. 14 shows a section view of a corner beam bearing at stud wall 70. At a corner of the shelter capable of withstanding extreme winds, load bearing studs 146 are mechanically coupled to truss stud 16 with twist straps 142 creating corner bay 154 as noted above. Load bearing studs 146 are enhanced in corners with track stiffener 156. Truss stud 16 is mechanically coupled to ridge 164 with clip 158.

In the preferred embodiment, ridge 164 a 4 inch by 4 inch by 14 gauge top chord and clip 158 is a 4 inch by 4 inch by 14 gauge long clip angle with four #10 screws on each leg. Track stiffener 156 is a 14 gauge track stiffener by 6 inches long at each outrigger.

FIG. 15 is a section view of a truss blocking at a stud wall. Load bearing stud 82 is mechanically coupled to continuous upper track 44 as noted in FIG. 8 above and can be enhanced with stiffener 156. Here, continuous upper track 144 is mechanically coupled to parallel track 160. Parallel track 160 is blocking each bay 154.

In the preferred embodiment, parallel track 170 is a 6 inch by 2 inch by 14 gauge track blocking each bay with two #10 screws to the top track.

The invention claimed is:

1. A shelter capable of withstanding extreme winds, the shelter comprising
    a concrete foundation mechanically coupled to a lower continuous track by an anchor bolt; the lower continuous track is mechanically coupled to a plurality of studs; plurality of studs are mechanically coupled to an upper continuous track forming an arrangement of studs; the arrangement of studs secured between two tracks provides additional stability against variable wind loads that normally damage buildings;
    the plurality of studs are arranged to create walls, where the walls are covered with a first exterior layer and a second exterior layer; such that the first exterior layer provides protection against live force loads and the second exterior layer provides protection against vibration;
    the walls have an interior surface and an exterior surface; the interior surface is perforated with an adjustable louvered vent; the exterior surface is perforated with a fixed louvered vent; such that the position of the fixed louvered vent is staggered from the position of the adjustable louvered vent enabling the shelter to rapidly adjust to changing pressure and avoid implosion while simultaneously preventing the life force load from penetrating the walls; and
    the upper continuous track is mechanically coupled to roofing.

2. The shelter of claim 1,
    the lintel tracks are mechanically coupled to the upper continuous track with a clip and straps; each lintel track is mechanically coupled to a lintel stud which is further mechanically coupled to an unpunched stud lintel; the lintel track is mechanically coupled to a door rated to withstand a category five hurricane.

3. The shelter of claim 1, the roofing further comprises a joist and a truss mechanically coupled to the upper continuous track and the truss is covered by a first roof exterior layer and a second roof exterior layer such where the truss protect the shelter from vibrations and negative pressure caused by high winds.

* * * * *